US009838881B2

United States Patent
Wei et al.

(10) Patent No.: US 9,838,881 B2
(45) Date of Patent: Dec. 5, 2017

(54) METHOD, DEVICE, AND SYSTEM FOR APPLYING FOR FREQUENCY SPECTRUM

(71) Applicant: Huawei Technologies Co., Ltd., Shenzhen (CN)

(72) Inventors: Xinpeng Wei, Shenzhen (CN); Lei Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 14/550,343

(22) Filed: Nov. 21, 2014

(65) Prior Publication Data
US 2015/0080010 A1    Mar. 19, 2015

Related U.S. Application Data

(63) Continuation of application No. PCT/CN2013/075070, filed on May 2, 2013.

(30) Foreign Application Priority Data

May 22, 2012  (CN) .......................... 2012 1 0159484

(51) Int. Cl.
*H04W 72/00* (2009.01)
*H04W 16/14* (2009.01)
(Continued)

(52) U.S. Cl.
CPC ............ *H04W 16/14* (2013.01); *H04W 4/06* (2013.01); *H04W 72/0453* (2013.01); *H04W 76/002* (2013.01)

(58) Field of Classification Search
CPC ............ H04W 16/14; H04W 72/0453; H04W 88/08; H04W 72/08; H04W 28/18;
(Continued)

(56) References Cited

U.S. PATENT DOCUMENTS

| | | | |
|---|---|---|---|
| 2011/0143761 A1* | 6/2011 | Uusitalo ............... | H04W 72/02 455/450 |
| 2011/0231302 A1* | 9/2011 | Stanforth ............. | G06Q 10/063 705/37 |

(Continued)

FOREIGN PATENT DOCUMENTS

| | | |
|---|---|---|
| CN | 102387505 A | 3/2012 |
| CN | 102412919 A | 4/2012 |
| WO | WO 2011/089875 A1 | 7/2011 |

OTHER PUBLICATIONS

LTE, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2" (Release 11) 3GPP TS 36.300, V11.1.0, Mar. 2012, 194 pages.

*Primary Examiner* — Olumide T Ajibade Akonai
(74) *Attorney, Agent, or Firm* — Brinks Gilson & Lione (57) ABSTRACT

A method, a device, and a system for applying for frequency spectrum are provided. The present invention relates to the field of wireless communications technologies, and is mainly used in a broadcast multicast service, so as to coordinate multiple access devices to apply for a same band of white frequency spectrum. The method includes: a controller sending first application information to a database (201), the first application information being used for applying for a frequency band of frequency spectrum for at least one access device; the controller receiving the frequency band of the frequency spectrum sent by the database (202); and the controller sending the frequency band of the frequency spectrum to the access device (203).

14 Claims, 9 Drawing Sheets

(51) Int. Cl.
*H04W 4/06* (2009.01)
*H04W 72/04* (2009.01)
*H04W 76/00* (2009.01)

(58) Field of Classification Search
CPC ..... H04W 28/26; H04W 48/16; H04W 76/02; H04W 88/12; H04W 88/182; H04L 27/0006; H04L 5/0023
USPC ................ 455/450–452.2, 509, 552.1, 553.1
See application file for complete search history.

(56) References Cited

U.S. PATENT DOCUMENTS

2011/0287802 A1* 11/2011 Ma ........................ H04L 5/0066
455/517
2012/0093092 A1* 4/2012 Kasslin ............... H04W 72/082
370/329
2012/0287804 A1 11/2012 Sun et al.
2013/0300941 A1* 11/2013 Kafle .................... H04W 16/14
348/725

* cited by examiner

METHOD, DEVICE, AND SYSTEM FOR APPLYING FOR FREQUENCY SPECTRUM

CROSS-REFERENCE TO RELATED APPLICATIONS

This application is a continuation of International Application No. PCT/CN2013/075070, filed on May 2, 2013, which claims priority to Chinese Patent Application No. 201210159484.5, filed on May 22, 2012, both of which are hereby incorporated by reference in their entireties.

TECHNICAL FIELD

The present invention relates to the field of wireless communications technologies and, in particular, to a method, a device, and a system for applying for frequency spectrum.

BACKGROUND

In wireless communications, data are mainly transmitted via assigned frequency spectrum resources, so as to carry out various services. The frequency spectrum resources are mainly managed by frequency spectrum administration organizations, and the frequency spectrum administration organizations have assigned a large amount of frequency spectrum resources to radio applications such as television signal propagation etc. However, some frequency spectrum resources having been assigned may not be used during a certain period of time in a certain area, and this part of unused frequency spectrum resources are called white frequency spectrum in this period of time. With a development of the wireless communications technologies, human demand for the frequency spectrum resources keeps growing. In order to improve the utilization of the frequency spectrum resources and alleviate the shortage of radio frequency spectrum resources, currently, frequency spectrum administration organizations of some countries began to set up relevant regulations to allow a user without a frequency spectrum license to use the white frequency spectrum. In application fields of cellular network, wireless local area network (WLAN), broadband access etc, wireless bandwidth can be increased by use of white frequency spectrum.

At present, different Masters apply for different frequency bands of the white frequency spectrum; however, there is no implementation mode for multiple Masters to apply for a same band of the white frequency spectrum simultaneously. Regarding services such as multimedia broadcast multicast (MBMS) which needs multiple Masters to apply for a same band of the white frequency spectrum, the mechanism in prior art for applying for the white frequency spectrum cannot support the implementation of such kind of services.

SUMMARY

Embodiments of the present invention provide a method, a device, and a system for applying for frequency spectrum, which can apply for a same frequency band of white frequency spectrum for multiple Masters.

In one aspect, embodiments of the present invention provide a method for applying for frequency spectrum, including:

sending, by a controller, first application information to a database, where the first application information is used to apply for a frequency band of frequency spectrum for at least one access device;

receiving, by the controller, the frequency band of the frequency spectrum sent by the database; and sending, by the controller, the frequency band of the frequency spectrum to the access device.

In another aspect, embodiments of the present invention further provide a method for applying for frequency spectrum, including:

sending, by an access device, first application information to a database, where the first application information is used to apply for a frequency band of frequency spectrum for at least one access device; and receiving, by the access device, the frequency band of the frequency spectrum sent by a controller, where the frequency band of the frequency spectrum is sent to the controller by the database.

In another aspect, embodiments of the present invention further provide a controller, including:

a sending unit, configured to send first application information to a database, where the first application information is used to apply for a frequency band of frequency spectrum for at least one access device;

a receiving unit, configured to receive the frequency band of the frequency spectrum sent by the database and applied by the first application information sent by the sending unit; and the sending unit being configured to send the frequency band of the frequency spectrum received by the receiving unit to the access device.

In another aspect, embodiments of the present invention further provide an access device, including:

a sending unit, configured to send first application information to a database, where the first application information is used to apply for a frequency band of frequency spectrum for at least one access device; and a receiving unit, configured to receive the frequency band of the frequency spectrum sent by a controller and applied by the first application information sent by the sending unit, wherein the frequency band of the frequency spectrum is sent to the controller by the database.

In another aspect, embodiments of the present invention further provide a system for applying for frequency spectrum, including:

the controller and the access device mentioned above.

The method, the device and the system for applying for frequency spectrum provided in the embodiments of the present invention can apply for a same band of white frequency spectrum for multiple access devices, so that multiple access devices can use the band of white frequency spectrum to carry out a service in their respective coverage, and compared to prior art, it can realize services such as MBMS etc which need multiple access devices to support.

BRIEF DESCRIPTION OF DRAWINGS

To describe the technical solutions in embodiments of the present invention or in the prior art more clearly, the following briefly introduces accompanying drawings needed for describing the embodiments or the prior art. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

Technical solutions of embodiments of the present invention will be clearly and completely described in the following with reference to the accompanying drawings in the embodiments of the present invention. Apparently, the embodiments described are merely a part rather than all embodiments of the present invention. All other embodiments obtained by persons of ordinary skill in the art based on embodiments of the present invention without creative efforts shall fall within the protection scope of the present invention.

Figure 1:
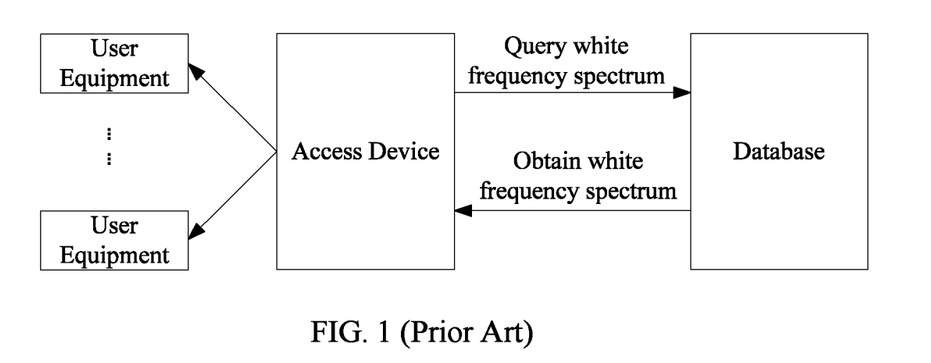
FIG. 1 is a schematic diagram of an access device applying for white frequency spectrum in the prior art.

Usually, an access device applies to a database for white frequency spectrum via a method of querying the database. The database centrally manages the white frequency spectrum in the coverage of an area. The information recorded in the database includes information of a geographic scope in which the frequency spectrum can be used, a period of usage time and so on. When a device needs to use the white frequency spectrum, the device initiates an application to a database for using frequency spectrum, and sends its information of geographic location, usage time, bandwidth required, transmission distance and etc to the database, then the database assigns available white frequency spectrum to this device via a corresponding algorithm according to the information sent by the device and the frequency spectrum resource information stored in itself. The specific process is, as shown in FIG. 1: the access device (Master) is responsible for applying to the database and obtaining white frequency spectrum, and afterwards assigns the white frequency spectrum to its access device (Slave) to use. In WLAN technologies, the Master can be an access point (AP), and the Slave can be user equipment (UE) accessing the AP.

Figure 2:
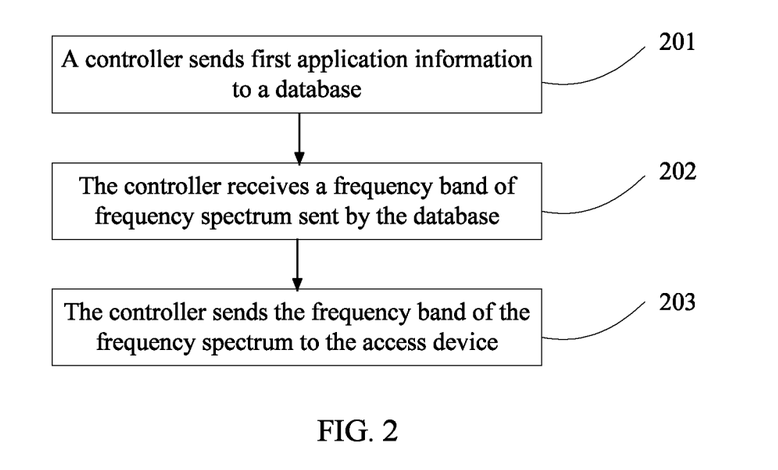
FIG. 2 is a flowchart of a method for applying for frequency spectrum according to an embodiment of the present invention.

An embodiment of the present invention provides an method for applying for frequency spectrum, as shown in FIG. 2, the method includes the following steps:

201, a controller sends first application information to a database.

The first application information is used to apply for a frequency band of frequency spectrum for at least one access device. The controller applies for a same band of the frequency spectrum for multiple access devices, so that the multiple access devices can utilize the band of the frequency spectrum to carry out a service in their respective coverage.

202, the controller receives a frequency band of frequency spectrum sent by the database.

The database retrieves frequency spectrum satisfying a condition in the first application information according to the first application information sent by the controller, and when the frequency spectrum satisfying the conditions is retrieved, sends a frequency band of frequency spectrum of the frequency spectrum to the controller.

203, the controller sends the frequency band of the frequency spectrum to the access device.

The controller sends the frequency band of the frequency spectrum sent by the database to each access device, and the access device thus can utilize the frequency band of the frequency spectrum to carry out a service.

The method for applying for frequency spectrum provided in the embodiments of the present invention can apply for a same band of frequency spectrum for multiple access devices, so that the multiple access devices can use the band of frequency spectrum to carry out a service in their own coverage, compared to prior art, services such as MBMS etc which need multiple access devices to support can be realized.

Figure 3:
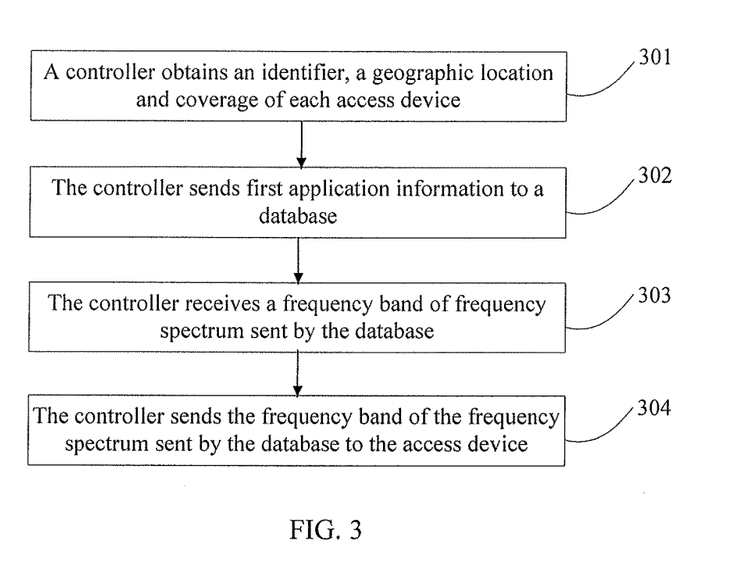
FIG. 3 is a flowchart of a method for applying for frequency spectrum according to another embodiment of the present invention.

Further, an embodiment of the present invention also provides an method for applying for frequency spectrum, as shown in FIG. 3, which makes a further extension to the method as shown in FIG. 2, and the method includes the following steps:

301, a controller obtains an identifier, a geographic location and coverage of each access device.

Where, the identifier can be represented as an identity number (Identity, briefed as ID), the geographic location can be represented by a latitude and a longitude, and the coverage can be represented by a length of a radius.

Optionally, the controller can also store the identifier, the geographic location and the coverage of the access device, and when applying for frequency spectrum next time, the execution of step 301 can be saved.

302, the controller sends first application information to a database.

The controller adds the identifier, geographic location and coverage stored by each access device into the first application information, and then sends the database the first application information with the identifier, the geographic location and the coverage of the access device added. Optionally, the first application information can further carry a service identifier and a controller identifier, and the controller identifier uniquely identifies the controller, and the service identifier may be, for example, MBMS.

303, the controller receives a frequency band of frequency spectrum sent by the database.

The database queries for a frequency band of frequency spectrum available for each access device to use together according to the identifier, the geographic location and the coverage of each access device in the first application information, and then sends the frequency band of frequency spectrum of the available frequency spectrum to the controller. The available frequency band of the frequency spectrum needs to satisfy: being able to be used in the coverage area of each access device.

304, the controller sends the frequency band of the frequency spectrum sent by the database to the access device.

Optionally, besides the frequency band of the frequency spectrum, information that the controller receives from the database and sends to the access device can also include information of antenna transmission power and an antenna angle etc used by each access device sent by the database. The controller can sends the information of the antenna transmission power and the antenna angle etc to each access device respectively, and also can sends the information of the antenna transmission power and the antenna angle etc of all the access devices to each access device, and the access device selects the information for itself to use to carry out a service. Embodiments of the present invention do not limit the sending mode of the information of the antenna transmission power and the antenna angle etc.

Further optionally, the database can send the frequency band of the frequency spectrum, as well as the information of the antenna transmission power and the antenna angle etc to the access device directly, instead of executing step 304, and the controller doesn't need to receive the information of the antenna transmission power and the antenna angle etc of the access device.

Figure 4:
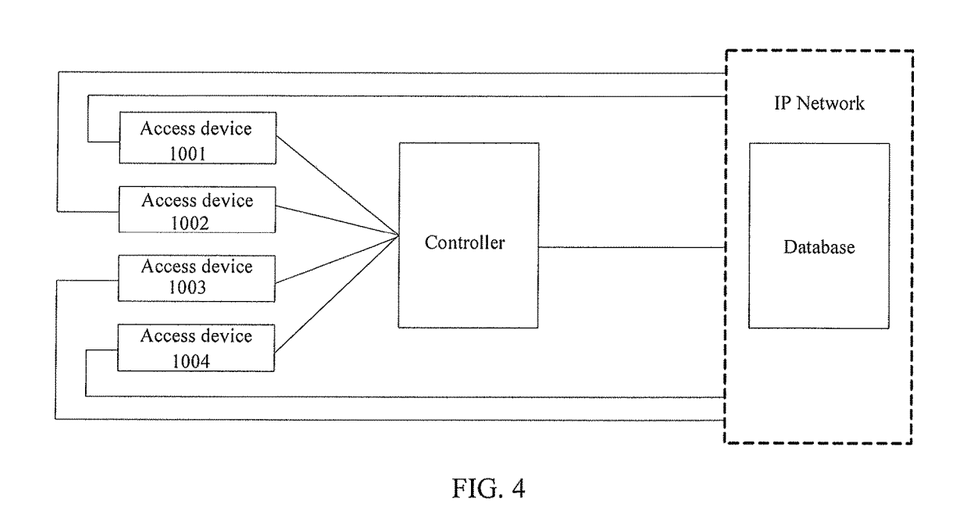
FIG. 4 is a schematic diagram of applying for frequency spectrum according to an embodiment of the present invention.

The method for applying for frequency spectrum shown in FIG. 3 can be used in a scenario of applying for white frequency spectrum. Specifically, in a scenario as shown in FIG. 4, four access devices need to apply for a same band of white frequency spectrum so as to carry out a service, each access device connects with a controller and an internet protocol (IP) network respectively, and there is a connection between the controller and the IP network, the access device and the controller can exchange data with the database via the IP network. After obtaining identifiers, geographic locations and coverage of the four access devices, the controller sends first application information to the database, and the first application information includes: IDs (1001, 1002, 1003 and 1004 in FIG. 4), latitude and longitude coordinates, radiuses of coverage of the four access devices, and a service identifier and a controller identifier. The database can calculate out service coverage according to the latitude and longitude coordinates and the radiuses of coverage of the four access devices, and retrieves white frequency spectrum available for this coverage. When the available white frequency spectrum is retrieved, the database sends a frequency band of frequency spectrum of the white frequency spectrum to the controller, together with information of the antenna transmission power and the antenna angle etc of the four access devices. After receiving the information of the frequency band of the white frequency spectrum, the antenna transmission power and the antenna angle etc used by the access device forwarded by the controller, the access device can carry out a relevant service. Or, the database sends the information of the frequency band of the white frequency spectrum, the antenna transmission power and the antenna angle etc to the four access devices and the frequency band of the white frequency spectrum is sent to the controller by the four access devices.

Figure 5:
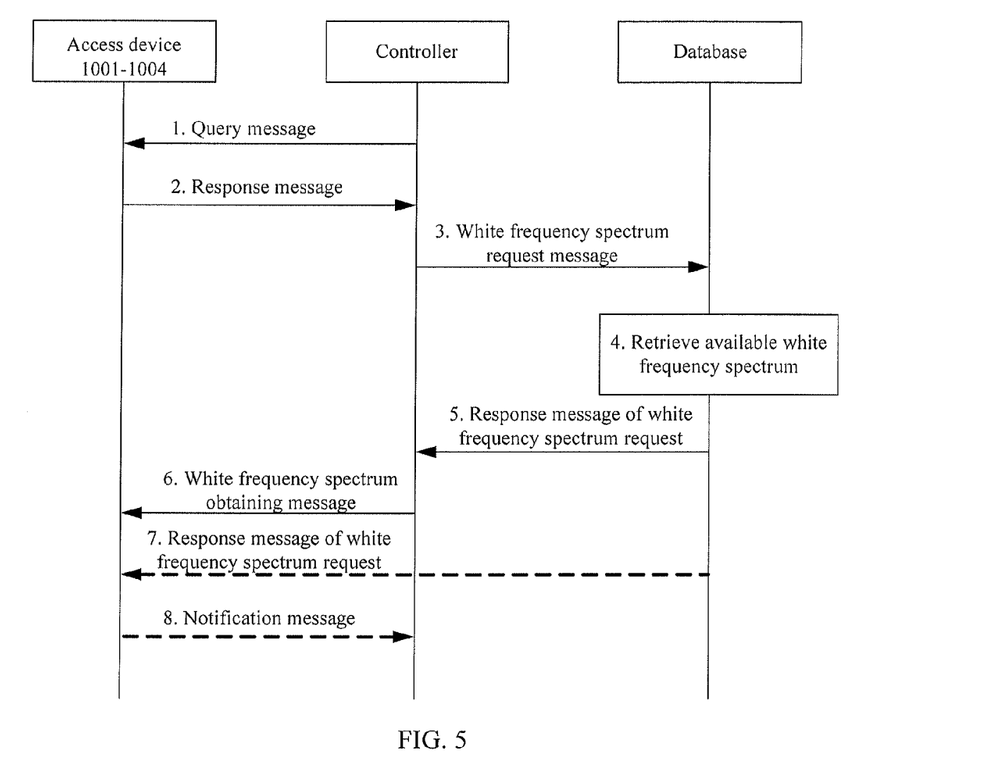
FIG. 5 is an interaction diagram of applying for white frequency spectrum in an embodiment of the present invention.

In the scenario shown in FIG. 4, the specific process of information interaction is as shown in FIG. 5:

1. A controller sends a query message to four access devices respectively, which is used to obtain identifiers, geographic locations and coverage of the four access devices;

2. The controller receives a response message sent by the four access devices respectively, where the response message carries the identifier, the geographic location and the coverage of each access device;

3. The controller sends a white frequency spectrum request message (namely first application information) to a database;

4. The database retrieves available white frequency spectrum;

5. The controller receives a response message of the white frequency spectrum request, sent by the database, and the response message carries information of a frequency band of the white frequency spectrum, antenna transmission power and an antenna angle etc used by the access devices; and 6. The controller sends a white frequency spectrum obtaining message to the four access devices respectively, and the message carries the information of the frequency band of the white frequency spectrum, the antenna transmission power and the antenna angle etc used by the access devices.

Optionally, the step 5 and step 6 can also be replaced by step 7 and step 8 (steps in dotted line) in FIG. 5:

7. The database sends a response message of the white frequency spectrum request to the four access devices respectively, and the response message carries the information of the frequency band of the white frequency spectrum, the antenna transmission power and the antenna angle etc used by the access device; and 8. The controller receives a notification message sent by the four access devices, and the notification message carries the frequency band of the white frequency spectrum sent by the database.

Figure 6:
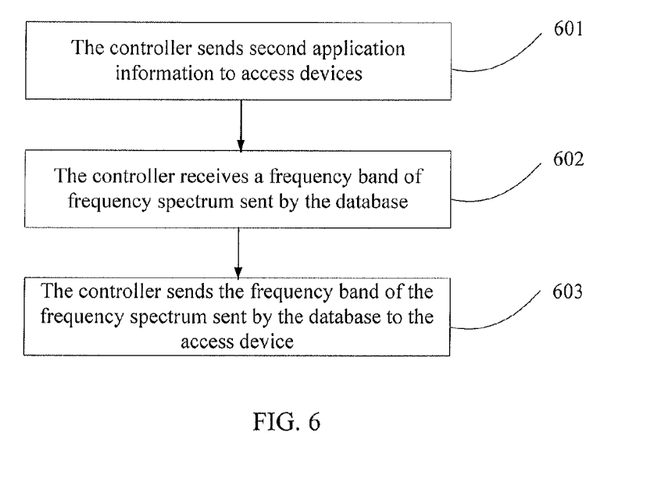
FIG. 6 is a flowchart of another method for applying for frequency spectrum according to an embodiment of the present invention.

Further, as shown in FIG. 6, the first application information can be sent by the access device to the database, that is the step 301 and step 302 in FIG. 3 can be replaced by step 601 in FIG. 6. Specifically, the method shown in FIG. 6 includes the following steps:

601, a controller sends second application information to access devices.

The second application information includes a service identifier and a controller identifier, first application information is sent to a database by the access devices, and the controller identifier uniquely identifies the controller. The access devices send the first application information to the database respectively, and each piece of first application information includes an ID, a geographic location and coverage stored in the access device, and also includes the service identifier and the controller identifier included in the second application information. The database identifies via the service identifier and the controller identifier that multiple access devices apply for a same band of frequency spectrum, retrieves available frequency spectrum according to the coverage of all the access devices and then sends a frequency band of the frequency spectrum to the controller.

602: the controller receives a frequency band of frequency spectrum sent by the database.

603, the controller sends the frequency band of the frequency spectrum sent by the database to the access device.

The step 602 and step 603 are the same with step 304 and step 305 correspondingly, which will not be repeated herein.

Optionally, the database can send the frequency band of the frequency spectrum as well as information of antenna transmission power and antenna angle etc to the access devices directly, instead of executing step 603, and the controller does not need to receive the information of the antenna transmission power and the antenna angle etc of each access device.

The method for applying for frequency spectrum shown in FIG. 6 can be used in a scenario of applying for white frequency spectrum. Specifically, in a scenario shown in FIG. 7, four access devices need to apply for a same band of white frequency spectrum so as to carry out a service. Each access device connects with a controller and an IP network respectively, and there is a connection between the controller and the IP network. The access device and the controller can exchange data with the database via the IP network. The controller sends second application information which includes an MBMS service identifier and a controller identifier to the four access devices, first application information is sent to the database by the four access devices respectively, and the first application information includes: an ID (1001, 1002, 1003 and 1004 in FIG. 7), latitude and longitude coordinates and a radius of coverage of the access device, the service identifier, the controller identifier, and the MBMS service identifier and the controller identifier included in the second application information. The database identifies via the service identifier and the controller identifier that the four access devices apply for a same band of frequency spectrum, can calculate out the service coverage according to the latitude and longitude coordinates and the radiuses of coverage of the four access devices, and retrieves available white frequency spectrum for this coverage. When the available white frequency spectrum is retrieved, the database sends a frequency band of frequency spectrum of the white frequency spectrum to the controller, together with information of antenna transmission power and an antenna angle etc, of the four access devices. After receiving the information of the frequency band of the white frequency spectrum, the antenna transmission power and the antenna angle etc forwarded by the controller, the access device can carry out a relevant service. Or, the database sends the information of the frequency band of the white frequency spectrum, the antenna transmission power and the antenna angle etc to the four access devices, and the frequency band of the white frequency spectrum is forwarded to the controller by the four access devices.

Figure 7:
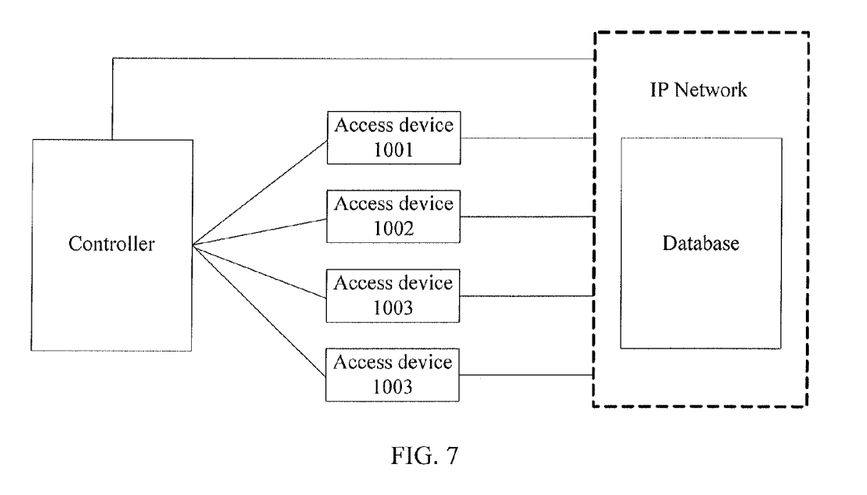
FIG. 7 is another schematic diagram of applying for frequency spectrum according to an embodiment of the present invention.
Figure 8:
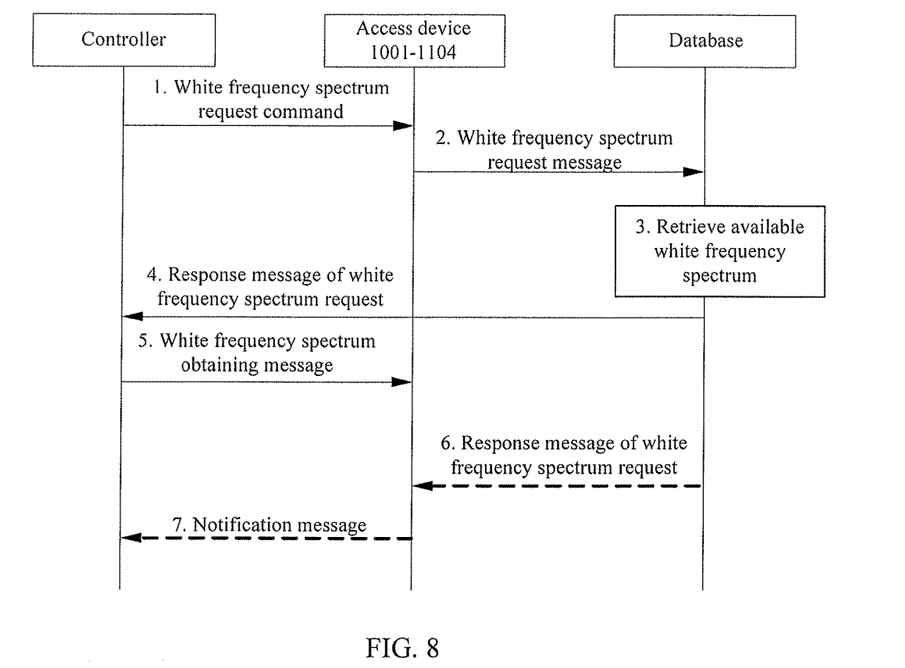
FIG. 8 is another interaction diagram of applying for white frequency spectrum according to an embodiment of the present invention.

In the scenario shown in FIG. 7, the specific process of information interaction is as shown in FIG. 8:

1. A controller sends a white frequency spectrum request command (namely second application information) to four access devices respectively;

2. The four access devices send a white frequency spectrum request message (namely first application information) to a database;

3. The database retrieves available white frequency spectrum;

4. The controller receives a response message of the white frequency spectrum request, sent by the database, and the response message carries information of a frequency band of the white frequency spectrum, antenna transmission power and antenna angles etc used by the access devices; and 5. The controller sends a white frequency spectrum obtaining message to the four access devices respectively, and the message carries the information of the frequency band of the white frequency spectrum, the antenna transmission power and the antenna angle etc used by the access device.

Optionally, the step 4 and step 5 can also be replaced by step 6 and step 7 (steps in dotted line) in FIG. 8:

6. The database sends a response message of the white frequency spectrum request, to the four access devices respectively, and the response message carries information of a frequency band of the white frequency spectrum, antenna transmission power and an antenna angle etc used by the access device; and 7. The controller receives a notification message sent by the four access devices, and the notification message carries the white frequency spectrum used by the access device used by the access device.

In another application scenario of the embodiments of the present invention, the aforementioned controller can be replaced by an access device with a highest priority, which is used as both an access device and a controller. The controller identifier in the first application information is the ID of this access device. The specific implementation mode can be realized with reference to the implementation mode shown in FIG. 3 or FIG. 6 and in combination of characteristics of the access device, and will not be detailed in the embodiments of the present invention.

The method for applying for frequency spectrum provided by the embodiments of the present invention centrally manages every access devices applying for frequency spectrum via a controller, and can apply for a same band of frequency spectrum for multiple access devices, thus to carry out a service supported by multiple access devices.

Embodiments of the present invention provide application scenarios that can apply a same band of white frequency spectrum for multiple access devices, which can be used in but not limited to an MBMS service.

Figure 9:
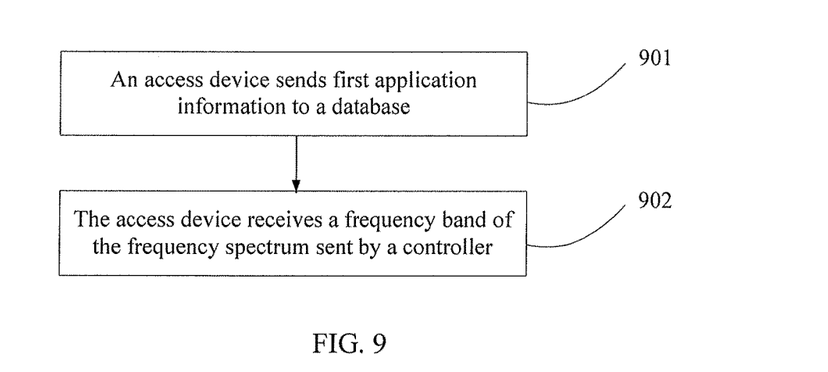
FIG. 9 is a flowchart of a method for applying for frequency spectrum according to still another embodiment of the present invention.

An embodiment of the present invention provides a method for applying for frequency spectrum, as shown in FIG. 9, the method includes following steps:

901, an access device sends first application information to a database.

The first application information is used to apply for a same frequency band of frequency spectrum for at least one access device.

902, the access device receives a frequency band of the frequency spectrum sent by a controller.

Multiple access devices apply to the database for a same band of frequency spectrum, for carrying out a service supported by multiple access devices.

In the method for applying for frequency spectrum provided in the embodiment of the present invention, multiple access devices apply for a same band of frequency spectrum, and use the band of frequency spectrum to carry out the service within their respective coverage, compared to the prior art, services such as MBMS etc that need multiple access devices to support can be realized.

Figure 10:
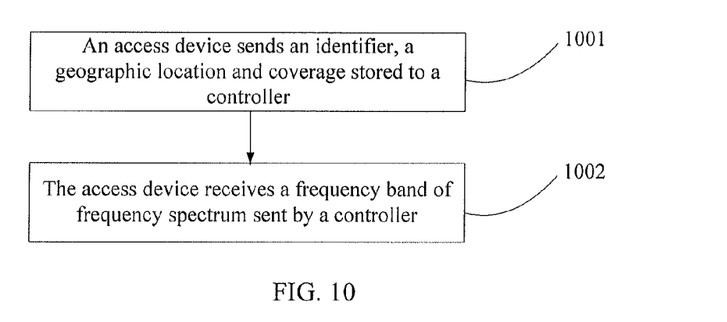
FIG. 10 is a flowchart of another method for applying for frequency spectrum according to an embodiment of the present invention.

Further, an embodiment of the present invention also provides an method for applying for frequency spectrum, as shown in FIG. 10, which makes a further extension to the method as shown in FIG. 9, and the method includes the following steps:

1001, an access device sends an identifier, a geographic location and coverage stored to a controller.

Where, the identifier can be represented by an ID, the geographic location can be represented by a latitude and a longitude, and the coverage can be represented by a length of a radius.

Optionally, the controller can store the identifier, the geographic location and the coverage of the access device sent by the access device, and when applying for frequency spectrum a next time, execution of step 1001 can be saved.

After the access device sends its stored identifier, geographic location and coverage to the controller, first application information is sent to a database by the controller. After receiving the identifier, the geographic location and the coverage which are sent by each access device, the controller adds the identifier, the geographic location and the coverage to the first application information, and sends the first application information to the database. Alternatively, the first application information can further carry a service identifier and a controller identifier, and the controller identifier uniquely identifies the controller. The database queries available frequency spectrum according to the information included in the first application information, and sends a frequency band of frequency spectrum of the available frequency spectrum to the access device. The available frequency spectrum needs to satisfy: being able to be used in the coverage area of each access device.

1002, the access device receives a frequency band of frequency spectrum sent by the controller.

The controller receives the frequency band of the frequency spectrum available to the access device sent by the database, and sent the frequency band of the frequency spectrum to each access device.

In addition to the frequency band of the frequency spectrum, the information that the access device receives from the controller can further include information of antenna transmission power and an antenna angle etc used by each access device sent from the database to the controller. The database sends the information of the frequency band of the frequency spectrum, the antenna transmission power and the antenna angle etc used by the access device to the controller, through which the information of the frequency band of the frequency spectrum, the antenna transmission power and the antenna angle etc are forwarded to the access device.

Optionally, the access device can also directly receive the information of the frequency band of the frequency spectrum, the antenna transmission power and the antenna angle etc used by the access device from the database, and sends the frequency band of the frequency spectrum therein to the controller.

The method for applying for frequency spectrum shown in FIG. 10 can be used in a scenario of applying for white frequency spectrum. Specifically, still referring to the scenario shown in FIG. 4, four access devices need to apply for a same band of white frequency spectrum so as to carry out a service, each access device connects with a controller and an IP network respectively, and there is a connection between the controller and the IP network, the access device and the controller can exchange data with the database via the IP network. After the four access devices send their stored identifiers, geographic locations and coverage to the controller, the controller adds the identifiers, the geographic locations and the coverage of the access devices to first application information and sends the first application information to the database. The first application information includes: IDs (1001, 1002, 1003 and 1004 in FIG. 4), latitude and longitude coordinates, and radiuses of coverage of the four access devices, as well as a service identifier and a controller identifier. The database can calculate out service coverage according to the latitude and longitude coordinates and the radiuses of coverage of the four access devices, and retrieves white frequency spectrum available for this coverage. When the available white frequency spectrum is retrieved, the database sends information of a frequency band of the white frequency spectrum, antenna transmission power and antenna angles etc used by the access devices to the four access devices through which the frequency band of the white frequency spectrum is forwarded to the controller. Or, the database sends the information of the frequency band of the white frequency spectrum, the antenna transmission power and the antenna angles etc used by the access devices to the controller, and after receiving the information of the frequency band of the white frequency spectrum, the antenna transmission power and the antenna angle etc forwarded by the controller, the access device can carry out the relevant service.

The specific process of information interaction mentioned above is the same as FIG. 5, reference can be made to the implementation of FIG. 5 for details, which will not be repeated herein.

Figure 11:
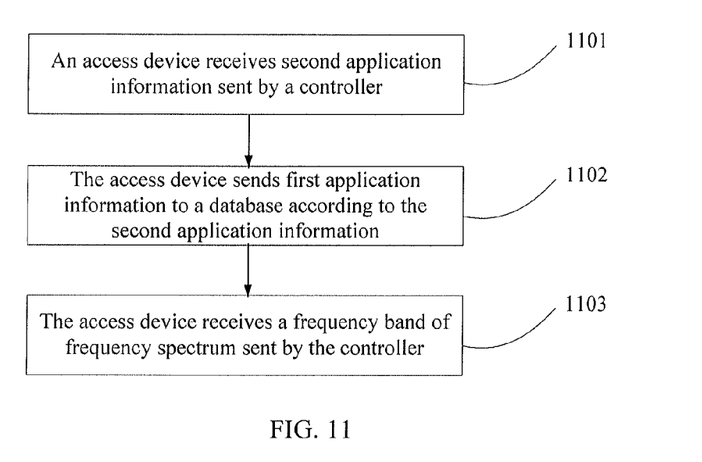
FIG. 11 is a flowchart of still another method for applying for frequency spectrum according to an embodiment of the present invention.

Further, as shown in FIG. 11, the first application information also can be sent to the database by the access device, that is, the step 1001 in FIG. 10 can be replaced by step 1101 and step 1102 in FIG. 11. Specifically, the method shown in FIG. 11 includes following steps:

1101, an access device receives second application information sent by a controller.

The second application information includes a service identifier and a controller identifier.

1102, the access device sends first application information to a database according to the second application information.

The access device sends the first application information to the database respectively, and each piece of first application information includes an ID, a geographic location and coverage stored by the access device, and also includes the service identifier and the controller identifier included in the second application information. The database identifies that multiple access devices apply for a same band of frequency spectrum, via the service identifier and the controller identifier included in the first application information, and retrieves available frequency spectrum according to the coverage of all the access devices.

1103, the access device receives a frequency band of frequency spectrum sent by the controller.

The implementation mode of this step is the same as step 1002 in FIG. 10 correspondingly, which will not be repeated herein.

The method for applying for frequency spectrum shown in FIG. 11 can be used in a scenario of applying for the white frequency spectrum. Specifically, still referring to the scenario shown in FIG. 7, four access devices need to apply for a same band of white frequency spectrum so as to carry out a service, each access device connects with a controller and an IP network respectively, and there is a connection between the controller and the IP network, the access device and the controller can exchange data with the database via the IP network. The four access devices receive second application information sent by the controller, and then send first application information to the database respectively. The first application information includes: IDs (1001, 1002, 1003 and 1004 in FIG. 7), latitude and longitude coordinates, and radiuses of coverage of the four access devices, and a service identifier and a controller identifier. The database can calculate out service coverage according to the latitude and longitude coordinates and the radiuses of coverage of the four access devices, and retrieves white frequency spectrum available for this coverage. When the available white frequency spectrum is retrieved, the database sends information of a frequency band of frequency spectrum of the white frequency spectrum, antenna transmission power and antenna angle etc to the four access devices through which the frequency band of the white frequency spectrum is forwarded to the controller. Or, the database sends the information of the frequency band of the white frequency spectrum, the antenna transmission power and the antenna angle etc to the controller, and the information of the frequency band of the white frequency spectrum, the antenna transmission power and the antenna angle etc is sent to the four access devices by the controller.

The specific process of information interaction mentioned above is the same as FIG. 8, reference can be made to the specific implementation of FIG. 5 for details, which will not be repeated herein.

The method for applying for frequency spectrum provided in the embodiments of the present invention centrally manages every access devices applying for frequency spectrum via a controller, and can apply for a same band of frequency spectrum for multiple access devices, thus to carry out a service supported by multiple access devices.

Embodiments of the present invention provide application scenarios, can apply a same band of white frequency spectrum for multiple access devices, and can be used in but not limited to an MBMS service.

The following is taking an MBMS service as an example to illustrate how to apply for white frequency spectrum while carrying out a service, with the implementation modes of FIG. 2 to FIG. 11.

Figure 12:
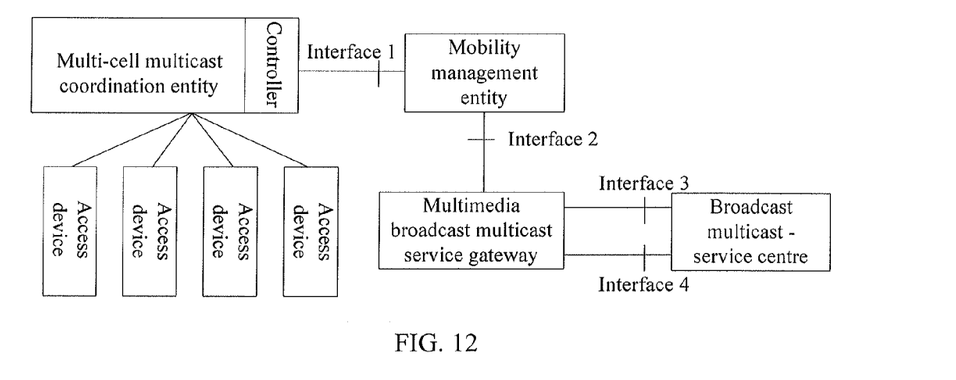
FIG. 12 is a schematic structural diagram of a broadcast multicast service in scenario 1 according to an embodiment of the present invention.
Figure 13:
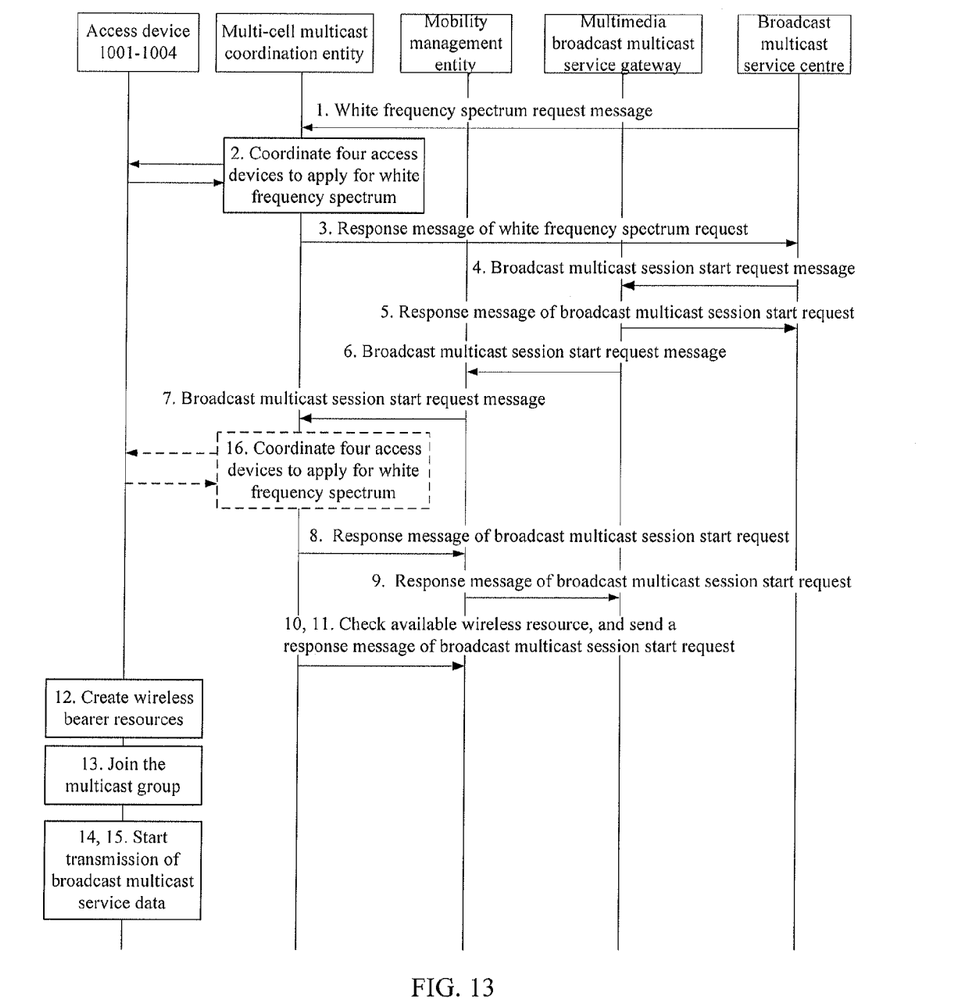
FIG. 13 is an interaction diagram of a broadcast multicast service according to an embodiment of the present invention.

Scenario 1:

As shown in FIG. 12, a controller is integrated in a multi-cell multicast coordination entity (Multi-cell Multicast Coordination Entity, briefed as MCE), and the MCE has a function of a controller. The MCE is linked to a mobility management entity (Mobility Management Entity, briefed as MME) via an M3 interface (interface 1), and linked to a multimedia broadcast multicast service gateway (MBMS-GW) via an Sm (interface 2) interface, and the MBMS-GW is linked to a broadcast multicast service centre (Broadcast Multicast Service Centre, briefed as BM-SC) via an SGmb interface (interface 3) and an Sgi-mb interface (interface 4). The executing process of an MBMS service is shown as FIG. 13:

1) The MCE receives a white frequency spectrum request message sent by the BM-SC, so as to request white frequency spectrum to carry out an MBMS service.

2) The MCE coordinates the four access devices to apply for the white frequency spectrum, of which the implementing process is as described as FIG. 2 to FIG. 11.

3) After the four access devices obtain the white frequency spectrum, the MCE sends a response message of the white frequency spectrum request to the BM-SC.

4) The BM-SC sends an MBMS session start request message to the MBMS-GW, the message includes attribute information of an MBMS session (such as quality of service (Qos), a service area of MBMS and etc).

5) The MBMS-GW sends a response message of the session start request to the BM-SC, to notify the BM-SC that the session start request message has been received.

6) The MBMS-GW creates MBMS bearer context, saves the attribute information of the MBMS session sent by the BM-SC, and sends an MBMS session start request message with the attribute information of the session to the MME.

7) The MME creates MBMS bearer context, saves the attribute information of the MBMS session sent by the MBMS-GW, and sends an MBMS session start request message with the attribute information of the session to the MCE.

8) The MCE sends a response message of the session start request to the MME, to notify that the session start request message has been received.

9) The MME sends a response message of the session start request to the MBMS-GW, to notify the MBMS-GW that the session start request message has been received.

10, 11) The MCE checks whether there is enough wireless resource (white frequency spectrum) in its responsible area to provide the MBMS service. If there is not enough wireless resource, then stop sending the session start request message to the 4 access devices, or preempt a wireless resource of other MBMS service according to an address resolution protocol (ARP), and the MCE returns the response message of the MBMS session start request to the MME.

12) The access devices create wireless bearer resources for MBMS transmission.

13) The access devices join a multicast group so as to transmit data of an MBMS user.

14, 15) Start transmission of MBMS service data.

The service process shown in FIG. 13 is to apply for white frequency spectrum before carrying out the MBMS service, and alternatively, applying for white frequency spectrum can also proceed during the carrying out of the service. Specifically, steps 1), 2), and 3) in FIG. 13 are omitted, and after step 7) is executed, the step 16) that the MCE coordinates the four access devices to apply for white frequency spectrum is executed, of which the implementing process is as described in FIG. 2 to FIG. 11. (represented by dotted lines in FIG. 13). And then step 8) to step 15) are executed. The step 16) and the steps 1), 2) and 3) have the same purpose and implementation mode, and are alternatively used in practical applications. Besides, it should be noted that, as the step 16) is executed during the carrying out of the service, the MCE can get that it needs to apply for white frequency spectrum for an MBMS service according to the session start request message sent by the MME, thus doesn't need to receive the white frequency spectrum request message sent by the BM-SC (that is step 1)), and also doesn't need to send the white frequency spectrum response message to the BM-SC after finishing applying for white frequency spectrum (that is step 3)).

Further, the step of applying for white frequency spectrum can be executed between any two steps before step 10) in FIG. 13, which will not describe one by one in the embodiments of the present invention.

Figure 14:
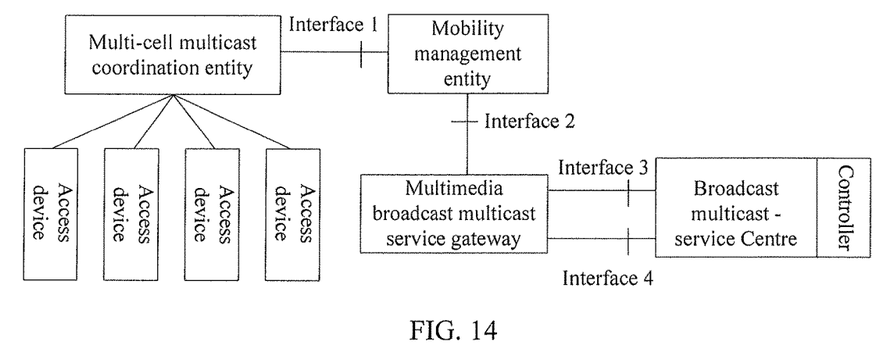
FIG. 14 is a schematic structural diagram of a broadcast multicast service in scenario 2 according to an embodiment of the present invention.

Scenario 2:

As shown in FIG. 14, in another scenario of the embodiments of the present invention, a controller is integrated in a BM-SC, and the BM-SC has a function of a controller. The MCE is linked to an MME via an M3 interface (interface 1), the MME is linked to an MBMS-GW via an Sm interface (interface 2), and the MBMS-GW is linked to the BM-SC via an SGmb interface (interface 3) and an Sgi-mb interface (interface 4). After applying for white frequency spectrum for access devices, the BM-SC needs to send a frequency band of white frequency spectrum to the MCE, so as to conduct MBMS service. The implementation mode of sending the frequency band of the white frequency spectrum to the MCE by the BM-SC can be:

A: after obtaining the frequency band of the white frequency spectrum, the BM-SC sends the frequency band of the white frequency spectrum to the MCE, and then step 4) to step 15) in FIG. 13 are executed in sequence, thus to complete the MBMS service.

B: after the BM-SC obtains the frequency band of the white frequency spectrum, step 4) to step 15) in FIG. 13 are executed in sequence, and the frequency band of the white frequency spectrum are carried in the corresponding messages in steps 4), 6) and 7), thus to send the frequency band of the white frequency spectrum to the MCE. Specifically, the frequency band of the white frequency spectrum is carried in the session start request message, and is sent to MCE via the MBMS-GW and the MME.

Figure 15:
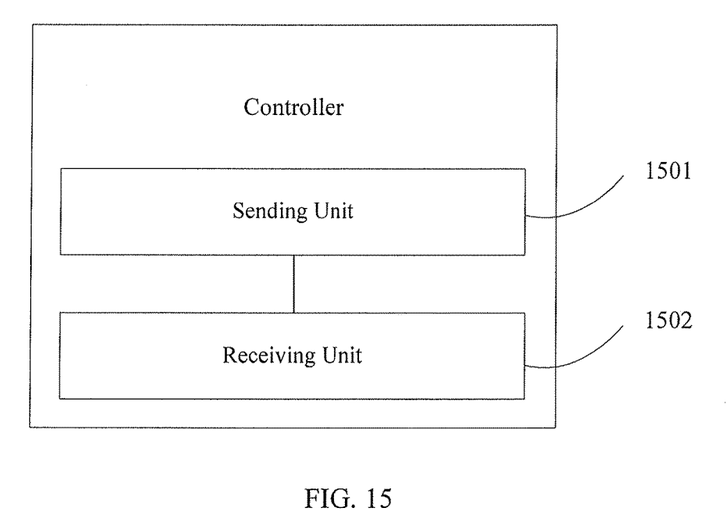
FIG. 15 is a schematic structural diagram of a controller according to still another embodiment of the present invention.

The embodiments of the present invention provide a controller, as shown in FIG. 15, the controller includes: a sending unit 1501 and a receiving unit 1502, where, The sending unit 1501 is configured to send first application information to a database, where the first application information is used to apply for a frequency band of frequency spectrum for at least one access device.

The first application information carries service coverage, an ID of each access device, and a geographic location of each access device. Optionally, the first application information can further carry a service identifier and a controller identifier, and the controller identifier uniquely identifies the controller.

The receiving unit 1502 is configured to receive the frequency band of the frequency spectrum sent by the database and applied for by the first application information sent by the sending unit 1501.

The database queries available frequency spectrum according to information included in the first application information, and then sends the frequency band of the frequency spectrum of the available frequency spectrum to the receiving unit 1502. The available frequency spectrum shall satisfy: being able to be used in the coverage area of each access device.

The sending unit 1501 is configured to send the frequency band of the frequency spectrum received by the receiving unit 1502 to the access device.

Figure 16:
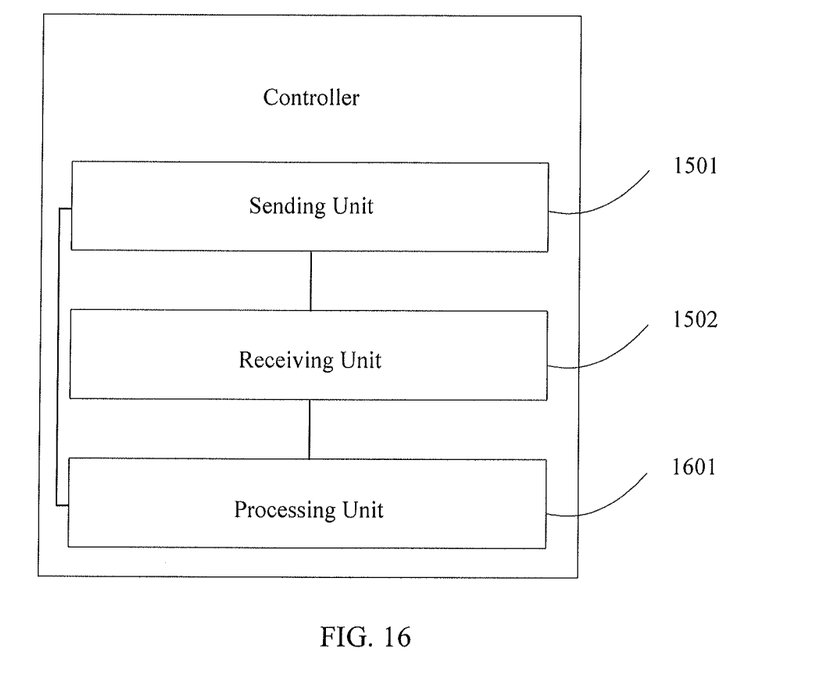
FIG. 16 is a schematic structural diagram of another controller according to an embodiment of the present invention.

Further, as shown in FIG. 16, the controller further includes a processing unit 1601.

The receiving unit 1502 is further configured to obtain an identifier, a geographic location and coverage of the access device. Where the identifier can be represented as an ID, the geographic location can be represented by a latitude and a longitude, and the coverage can be represented by a length of a radius.

The processing unit 1601 is configured to add the identifier, the geographic location and the coverage of the access device obtained by the receiving unit 1502 to the first application information.

Further, the sending unit 1501 is further configured to send second application information to the access device, to send the first application information to the database via the access device.

The second application information includes a service identifier and a controller identifier and the controller identifier uniquely identifies the controller. The access device sends the first application information to the database respectively, and each piece of first application information includes an ID, a geographic location and coverage of the access device, and also includes the service identifier and controller identifier included in the second application information. The database identifies via the service identifier and the controller identifier that multiple access devices apply for a same band of frequency spectrum, retrieves available frequency spectrum according to the coverage of all the access devices, and sends the frequency band of the frequency spectrum to the controller.

Further, the receiving unit 1502 is further configured to receive information of the frequency band of the frequency spectrum, transmission power and an antenna angle used by the access device and sent by the database.

The sending unit 1501 is further configured to send the information of the frequency band of the frequency spectrum, the transmission power and the antenna angle used by the access device to the access device.

The sending unit 1501 can respectively send each access device the information of the antenna transmission power and the antenna angle etc used by the access device, and also can send each access device the information of the antenna transmission power and the antenna angles etc used by all the access devices and the access devices select the information for their own use to carry out a service. Embodiments of the present invention do not limit the sending mode of the information.

Further optionally, the database can send the frequency band of the frequency spectrum and the information of the antenna transmission power and the antenna angle etc to the access device directly, and the receiving unit 1502 receives the frequency band of the frequency spectrum sent by the access device.

Further, the sending unit 1501 is configured to send the frequency band of the frequency spectrum to an MCE, so as to carry out a broadcast multicast service.

The controller described in the embodiments of the present invention can be an access device with a highest priority, which is used as both an access device and a controller. The controller identifier in the first application information is an ID of this access device.

The controller provided in the embodiments of the present invention can centrally manage each access device that applies for frequency spectrum, apply for a same band of frequency spectrum for multiple access devices, thus to carry out a service supported by multiple access devices.

Figure 17:
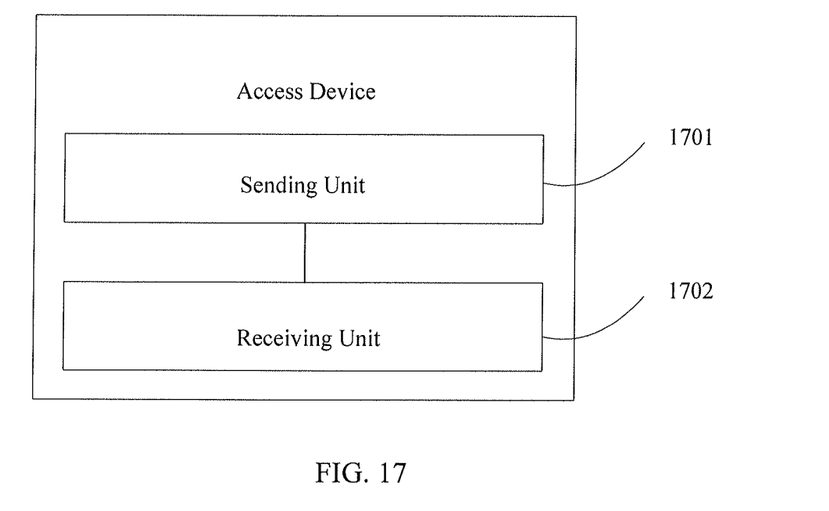
FIG. 17 is a schematic structural diagram of an access device according to still another embodiment of the present invention.

An embodiments of the present invention provides an access device, as shown in FIG. 17, the access device includes: a sending unit 1701 and a receiving unit 1702, where, The sending unit 1701 is configured to send first application information to a database, where the first application information is used to apply for a frequency band of frequency spectrum for at least one access device.

The receiving unit 1702 is configured to receive the frequency band of the frequency spectrum sent by a controller and applied for by the first application information sent by the sending unit 1701, where the frequency band of the frequency spectrum is sent by the database to the controller.

Further, the sending unit 1701 is specifically configured to send an identifier, a geographic location and coverage stored in the access device to the controller, so that the controller sends the first application information to the database. Optionally, the first application information can further carry a service identifier and a controller identifier, and the controller identifier uniquely identifies the controller.

The receiving unit 1702 is further configured to receive second application information sent by the controller.

The second application information includes a service identifier and a controller identifier, and the controller identifier uniquely identifies the controller.

After the receiving unit 1702 receives the second application information, the sending unit 1701 sends the first application information to the database, and each piece of first application information includes an ID, a geographic location and coverage of the access device, and also includes a service identifier and a controller identifier included in the second application information. The database identifies, via the service identifier and the controller identifier, that multiple access devices apply for a same band of frequency spectrum, and retrieves available frequency spectrum according to the coverage of all the access devices.

Further, the receiving unit 1702 is specifically configured to receive information of the frequency band of the frequency spectrum, transmission power and an antenna angle sent by the controller.

The access device described in the embodiments of the present invention includes but is not limited to an AP.

The access device provided in the embodiments of the present invention, is through a controller to make centralized management of each access device that applies for frequency spectrum, a same band of frequency spectrum can be applied for multiple access devices, thus to carry out a service supported by multiple access devices.

With reference to the embodiments shown in FIG. 2 to FIG. 17, an embodiment of the present invention provide a system for applying for frequency spectrum, and the system includes: a controller and an access device, where, The controller can be a controller as shown in FIG. 15 and FIG. 16, and the access device can be a function of the device for applying for frequency spectrum shown in FIG. 17.

The system for applying for frequency spectrum provided in the embodiment of the present invention, is through the controller to make centralized management of each access device that applies for frequency spectrum, can apply for a same band of frequency spectrum for multiple access devices, thus to carry out a service supported by multiple access devices.

The system for applying for frequency spectrum provided in the embodiment of the present invention can apply for a same band of white frequency spectrum for multiple access devices, which can be used in but not limited to an MBMS service.

Through the illustration of the embodiments above, persons of ordinary skill in the art can clearly understand that the present invention can be implemented by means of software plus necessary universal hardware, certainly, it can also be implemented by hardware, however, in many cases the former way is a preferred embodiment. Based on such understanding, the technical solutions of the present invention in essence, or the part contributing to the prior art may be embodied in a form of a software product, and the computer software product is stored in a readable storage medium, such as in a floppy disk, a hard disk or an optical disk etc of a computer, and includes several instructions so as to make a computer device (may be a personal computer, a server, or a network device, etc.) to execute the methods described in the embodiments of the present invention.

The above is merely specific embodiments of the present invention, but does not intend to limit the protection scope of the present invention, variations or replacement that may be easily thought of in the technical scope disclosed in the present invention by persons of ordinary skill in the art, shall fall within the protection scope of the present invention. Therefore, the protection scope of the present invention should be subject to the protection scope of the claims.

What is claimed is:

1. A method for applying for frequency spectrum, comprising:
    sending, by a controller, first application information to a database, wherein the first application information is used to apply for a same frequency band of frequency spectrum for at least two access devices;
    receiving, by the controller, the frequency band of the frequency spectrum sent by the database, comprising, receiving, by the controller, information of the frequency band of the frequency spectrum, transmission power and an antenna angle used by the access devices and sent by the database; and
    sending, by the controller, the frequency band of the frequency spectrum to the access devices, comprising sending, by the controller, the information of the frequency band of the frequency spectrum, the transmission power and the antenna angle used by the access device, to the access devices.

2. The method according to claim 1, wherein before the sending, by a controller, first application information to a database, the method further comprises:
    obtaining, by the controller, an identifier, a geographic location and coverage of the access devices; and
    adding, by the controller, the identifier, the geographic location and the coverage of the access devices to the first application information.

3. The method according to claim 1, wherein the sending, by a controller, first application information to a database, comprises:
    sending, by the controller, second application information to the access devices, to send the first application information to the database via the access devices, wherein the first application information includes an identifier, a geographic location and coverage stored in the access devices.

4. The method according to claim 1, wherein after the sending, by the controller, the frequency band of the frequency spectrum to the access devices, the method further comprises: sending, by the controller, the frequency band of the frequency spectrum to a multi-cell multicast coordination entity.

5. A method for applying for frequency spectrum, comprising:
    sending, by an access device, first application information to a database, wherein the first application information is used to apply for a same frequency band of frequency spectrum for at least two access devices; and
    receiving, by the access devices, the frequency band of the frequency spectrum sent by a controller, wherein the frequency band of the frequency spectrum is sent to the controller by the database, comprising receiving, by the access devices, information of the frequency band of the frequency spectrum, transmission power and an antenna angle sent by the controller.

6. The method according to claim 5, wherein the sending, by an access device, first application information to a database, comprises:
    sending, by the access devices, an identifier, a geographic location and coverage stored, to the controller, so that the controller sends the first application information to the database.

7. The method according to claim 5, wherein the sending, by an access devices, first application information to a database, comprises:
    receiving, by the access devices, second application information sent by the controller; and sending, by the access devices, the first application information to the database according to the second application information, wherein the first application information includes an identifier, a geographic location and coverage stored in the access devices.

8. An apparatus, comprising:
a transmitter, configured to send first application information to a database, wherein the first application information is used to apply for a same frequency band of frequency spectrum for at least two access devices;
a receiver, configured to receive the frequency band of the frequency spectrum sent by the database and applied for by the first application information sent by the transmitter; and
the transmitter configured to send the frequency band of the frequency spectrum received by the receiver to the access devices;
wherein the receiver is configured to receive information of the frequency band of the frequency spectrum, transmission power and an antenna angle used by the access devices and sent by the database; and the transmitter is configured to send the information of the frequency band of the frequency spectrum, the transmission power and the antenna angle used by the access devices and received by the receiver, to the access devices.

9. The apparatus according to claim 8, wherein the receiver is further configured to obtain an identifier, a geographic location and coverage of the access devices;
the apparatus further comprises a processor, wherein the processor is configured to add the identifier, the geographic location and the coverage of the access devices to the first application information.

10. The apparatus according to claim 8, wherein the transmitter is further configured to send second application information to the access devices, to send the first application information to the database via the access devices, and the first application information includes an identifier, a geographic location and coverage stored in the access devices.

11. The apparatus according to claim 8, wherein the transmitter is further configured to send the frequency band of the frequency spectrum received by the receiver to a multi-cell multicast coordination entity.

12. An access device, comprising:
a transmitter, configured to send first application information to a database, wherein the first application information is used to apply for a same frequency band of frequency spectrum for at least two access devices; and
a receiver, configured to receive the frequency band of the frequency spectrum sent by a controller and applied by the first application information sent by the transmitter, wherein the frequency band of the frequency spectrum is sent to the controller by the database, and the receiver configured to receive information of the frequency band of the frequency spectrum, transmission power and an antenna angle sent by the controller.

13. The access device according to claim 12, wherein the transmitter is configured to send an identifier, a geographic location and coverage stored in the access devices to the controller, so that the controller sends the first application information to the database.

14. The access device according to claim 12, wherein the receiver is further configured to receive second application information sent by the controller; and
the transmitter sends the first application information to the database according to the second application information received by the receiver, wherein the first application information includes an identifier, a geographic location and coverage stored in the access devices.

* * * * *